US008267414B2

(12) United States Patent
Mesa et al.

(10) Patent No.: US 8,267,414 B2
(45) Date of Patent: Sep. 18, 2012

(54) SUSPENSION ARM ASSEMBLY AND METHOD OF RETROFITTING

(75) Inventors: Gilberto Mesa, Miami, FL (US); Ruben Dario Lopez, Hialeah, FL (US)

(73) Assignee: Vertex Export and Import, Corp., Miami, FL (US)

( * ) Notice: Subject to any disclaimer, the term of this patent is extended or adjusted under 35 U.S.C. 154(b) by 372 days.

(21) Appl. No.: 12/590,525

(22) Filed: Nov. 10, 2009

(65) Prior Publication Data

US 2011/0109057 A1  May 12, 2011

(51) Int. Cl.
*B62D 7/16* (2006.01)

(52) U.S. Cl. ............ 280/93.511; 280/93.51; 280/93.502; 280/124.134; 403/351; 403/367; 403/369

(58) Field of Classification Search .............. 280/86.75, 280/86.756, 124.134, 86.757, 124.121, 93.502, 280/93.51, 93.511; 403/221, 228, 243, 351, 403/352, 358, 359.6, 365, 367, 369
See application file for complete search history.

(56) References Cited

U.S. PATENT DOCUMENTS

| | | | | | |
|---|---|---|---|---|---|
| 1,871,918 | A | * | 8/1932 | Rossman | 403/226 |
| 2,027,577 | A | * | 1/1936 | Crane | 267/189 |
| 2,304,291 | A | * | 12/1942 | Wahlberg | 280/124.127 |
| 2,740,650 | A | * | 4/1956 | Hutton | 403/224 |
| 2,792,215 | A | * | 5/1957 | Timpner et al. | 267/189 |
| 2,827,281 | A | * | 3/1958 | Cooney | 267/202 |
| 2,828,969 | A | * | 4/1958 | Hoffman | 280/5.521 |
| 2,834,624 | A | * | 5/1958 | Bettison | 403/227 |
| 2,879,090 | A | * | 3/1959 | Everitt et al. | 403/227 |
| 2,971,770 | A | * | 2/1961 | Wagner | 280/124.134 |
| 3,240,509 | A | * | 3/1966 | Pierce | 280/124.134 |
| 3,257,121 | A | * | 6/1966 | Muller | 280/86.756 |
| 3,819,202 | A | * | 6/1974 | Castoe | 80/86.757 |
| 4,213,718 | A | * | 7/1980 | Lumby | 403/197 |
| 4,256,413 | A | * | 3/1981 | Abe | 403/282 |
| 4,405,256 | A | * | 9/1983 | King, Jr. | 403/408.1 |
| 4,738,458 | A | * | 4/1988 | Warner | 280/86.758 |
| 4,798,397 | A | * | 1/1989 | Komiya | 280/124.152 |
| 4,929,115 | A | * | 5/1990 | Lunke et al. | 403/228 |
| 5,060,962 | A | * | 10/1991 | McWethy | 280/304.1 |
| 5,765,844 | A | * | 6/1998 | Wood | 280/93.509 |
| 5,794,965 | A | * | 8/1998 | Stuker et al. | 280/124.169 |
| 5,851,018 | A | * | 12/1998 | Curran et al. | 280/250.1 |

(Continued)

FOREIGN PATENT DOCUMENTS

DE  3138534 A1 * 6/1982

(Continued)

*Primary Examiner* — Paul N Dickson
*Assistant Examiner* — Nicole Verley
(74) *Attorney, Agent, or Firm* — Malloy & Malloy, P.L.

(57) ABSTRACT

A suspension assembly structured to facilitate a selective variance in a height of a vehicle including at least one suspension arm having a suspension joint structured to vary the height of the vehicle dependent on the operative orientation of the suspension arm and suspension joint when connected to the vehicle. The suspension joint includes two bushing members each formed of a resilient material and two retaining assemblies, wherein each retaining assembly is disposed in retaining relation to a different one of the two bushing members on opposite sides of one end of the suspension arm. Either each of the bushing members or each of the two retaining assemblies includes a first section and a second section being of different, predetermined thicknesses. While the suspension arm and suspension joint may be produced as equipment of original manufacture, a conventional suspension arm may be repaired or retrofit by replacing its original suspension joint with a modified suspension joint.

20 Claims, 8 Drawing Sheets

U.S. PATENT DOCUMENTS

| | | | | |
|---|---|---|---|---|
| 5,992,863 A | * | 11/1999 | Forbes-Robinson et al. | 280/86.751 |
| 6,036,205 A | * | 3/2000 | Schlosser et al. | 280/86.753 |
| 6,328,315 B1 | * | 12/2001 | Hebenstreit | 277/634 |
| 6,381,935 B1 | * | 5/2002 | Wattron et al. | 56/14.9 |
| 7,210,693 B2 | * | 5/2007 | Ingalls et | 280/86.756 |
| 7,293,787 B2 | * | 11/2007 | Nunez et al. | 280/124.134 |
| 7,331,589 B2 | * | 2/2008 | Ingalls et al. | 280/86.756 |
| 7,364,176 B2 | * | 4/2008 | Saitoh et al. | 280/124.13 |
| 7,374,131 B2 | * | 5/2008 | Tiid et al. | 244/118.5 |
| 7,406,777 B2 | * | 8/2008 | Grover et al. | 33/645 |
| 7,568,711 B2 | * | 8/2009 | Houser et al. | 280/86.756 |
| 7,793,951 B2 | * | 9/2010 | Byers et al. | 280/93.502 |
| 2006/0226621 A1 | * | 10/2006 | Byers et al. | 280/93.507 |
| 2008/0136071 A1 | * | 6/2008 | Weisbeck et al. | 267/136 |
| 2011/0031713 A1 | * | 2/2011 | Ekbundit | 280/124.121 |

FOREIGN PATENT DOCUMENTS

| | | |
|---|---|---|
| DE | 4006922 A1 * | 9/1991 |
| JP | 04008620 A * | 1/1992 |
| JP | 06055918 A * | 3/1994 |

* cited by examiner

SUSPENSION ARM ASSEMBLY AND METHOD OF RETROFITTING

BACKGROUND OF THE INVENTION

1. Field of the Invention

This invention is directed to a suspension assembly comprising at least one suspension arm operatively connected to a motor vehicle and structured to selectively vary the height, i.e., elevation of the frame, of the vehicle relative to a support surface, dependent on which of at least two operative orientations the suspension arm is disposed when connected to the vehicle, thereby varying the effective center of gravity of the vehicle, which in turn alters the vehicle's performance characteristics. In addition, the present invention is directed to a method of assembling a suspension arm, including repairing and/or retrofitting a conventional suspension arm, including a modified suspension joint structured to facilitate the selective variance of a vehicle's height dependent on the operative orientation of the suspension arm and the suspension joint when connected to the vehicle.

2. Description of the Related Art

Suspension systems for motor vehicles vary greatly in structure and function based at least in part on the design and intended performance characteristics of the vehicle on which they are mounted. Typically, a suspension system includes a plurality cooperatively structured and disposed components, including one or more suspension arms, which collectively serve to interconnect the wheel assemblies to the vehicle frame. As such a suspension assembly is intended to movably support and suspend the vehicle at a predetermined height, while providing sufficient stability to the vehicle when traveling over a variety of different road or other supporting surfaces.

One known or conventional suspension assembly incorporates an elongated suspension arm serving to interconnect a correspondingly disposed wheel assembly to the frame of the vehicle, utilizing a variety of different types of mechanical connecting linkage. Further, a control or suspension joint is conventionally mounted on one end of the suspension arm adjacent to the vehicle frame, which serves to moveably connect the suspension arm to the frame through the aforementioned mechanical or connecting linkage. The structures of known or conventional suspension joints also vary significantly; however, in certain high performance and/or sports vehicles the use of a "ball and socket" type of construction substantially defines the structure of the suspension joint. As such, the "ball" portion of the joint is movably disposed within an interior of a "socket" type casing associated with the vehicle end of the suspension arm, wherein the ball comprises connecting members which extend outwardly from opposite sides thereof allowing the suspension arm to be affixed to the frame of the vehicle, and yet be movable in a substantially transverse direction relative to the vehicle, as necessitated by various driving conditions.

While ball and socket suspension joints, of the type generally described above, are considered to be operable for their intended purpose, certain problems and disadvantages are recognized as being associated therewith. More specifically, even after a relatively brief period of use, the ball and socket components of the joint assembly may be worn out of dimensional tolerance. Such loss of dimensional tolerance is a result of the continuous and significant stress forces placed on the ball and socket joint during operation of the vehicle, thereby negatively impacting the handling characteristics of the vehicle. In addition to a possible decrease in performance characteristics, reoccurring noises may develop, such as annoying "rattling" sounds, due to interaction between the worn ball and socket joint components of the suspension joint. As should be apparent, such a lessening of the operation of the suspension assembly is troublesome to the vehicle operator, especially in situations when this type of suspension joint is mounted on a high performance and/or expensive automobile.

Correction of this problem typically involves the removal of the suspension arm and accompanying ball and socket joint and a replacement thereof with a new suspension arm and joint assembly. Such replacement can be extremely expensive to the owner of the vehicle thereby further adding to the frustration in the utilization of such suspension arms and associated ball and socket type of joint assemblies. Accordingly, there is a need in the segment of the automotive industry associated with suspension assemblies for motor vehicles for an improved suspension arm incorporating a suspension joint which overcomes the disadvantages and problems of the type generally set forth above. Such a proposed and improved suspension arm assembly should include structural and operative features which alleviate operational failure of conventional joint structures caused by normal operating conditions over a given period of time. Further, an improved suspension arm assembly should incorporate components and design features which assure a long operable life, while still providing the desirable "feel" of the vehicle, which may be of particular importance to drivers and owners of high performance, sport vehicles. Finally, the structure of such an improved joint assembly should facilitate the conversion of conventional suspension arms by replacing the original suspension joint with an improved suspension joint, so as to significantly reduce the cost associated with the repair or replacement of conventional suspension assemblies.

SUMMARY OF THE INVENTION

The present invention is directed to a suspension assembly including at least one suspension arm having a suspension joint disposed on one end thereof. In at least one embodiment, the suspension assembly comprises a plurality of such suspension arms each being interconnected between the frame of the vehicle and a different one of a pair of corresponding wheel assemblies disposed on opposite sides of a vehicle, e.g., front driver's side and front passenger side, rear driver's side and rear passenger side. More specifically, the suspension assembly of the present invention includes at least one suspension arm structured to facilitate the selective variance of the height of the vehicle dependent, at least in part, on which of at least two operative orientations the suspension arm is disposed when connected to the vehicle.

As set forth above, a practical application of the suspension assembly of the present invention includes one suspension arm disposed in a supporting and interconnecting relation between the vehicle frame and one of the corresponding wheel assemblies of the vehicle. However, for purposes of clarity, the suspension assembly of the present invention will be described with specific reference to one suspension arm having a substantially equivalent structure to each of a plurality of suspension arms used with or defining a part of the subject suspension assembly.

Accordingly, the at least one suspension arm includes a suspension joint movably connected to one end thereof and extending through the one end in outwardly projecting relation to opposite sides of the one end. The suspension joint further comprises at least two bushing members formed of a material having predetermined resilient characteristics to facilitate the operation of the suspension joint in the intended manner. Moreover, each bushing member is disposed in a retained position on a different opposite side of the one end of the suspension arm. As will be explained in greater detail hereinafter, the two bushing members are cooperatively structured and disposed to facilitate and permit movement of the suspension arm in a substantially transverse direction relative to the bushing members, as necessitated by various driving conditions, similar to that of a "ball and socket" type of suspension joint.

Further, in at least one embodiment, the structure of the suspension arm and the suspension joint facilitates its connection to the vehicle at least in either a first operative orientation or in a second operative orientation. More in particular, the first operative orientation establishes or defines the vehicle being disposed at a first vehicle height, and a corresponding first effective center of gravity. Alternatively, the second operative orientation of the suspension arm and the suspension joint on the vehicle establishes or defines a second vehicle height, and a corresponding second effective center of gravity, wherein the first and second vehicle heights are different from one another. Moreover, the first and second operative orientations of the suspension arm and suspension joint may be generally defined by oppositely inverted orientations thereof when connected to the vehicle. More specifically, each of the two operative orientations is defined by different ones of the two bushing members being disposed on an upper oriented side of the suspension arm and on an under oriented side of the suspension arm, when the suspension arm is connected to the vehicle. In either operative orientation, the suspension arm of the present invention further serves to support the vehicle frame relative to a corresponding wheel assembly.

Additional structural features of at least one embodiment of the joint assembly include each of the bushing members comprising a first section and a second section disposed in at least partially spaced and generally opposed relation to one another. As such, each of the bushing members may be integrally or otherwise appropriately formed into an integral or other appropriate one piece construction, wherein the first and second sections of each bushing member have different, predetermined thicknesses or transverse dimensions. In addition, the first and second sections of one of the two bushing members are oppositely disposed or oriented, relative to the length of the suspension arm, as compared to the first and second sections of the other of the two bushing members of the suspension joint. Such opposite disposition or orientation of the first and second sections of each bushing member is maintained when the suspension arm is connected to the vehicle in either of the two operative orientations, as set forth above.

In more specific terms, when the suspension arm is disposed in either the first or second operative orientation, one of the opposite sides thereof assumes an "upper" orientation and the other of the opposite sides assumes and "under" orientation. Accordingly, the first and second sections of the bushing member disposed on the upper oriented side of the suspension arm are oppositely oriented relative to the first and second sections of the other bushing member disposed on the under oriented side of the suspension arm. As a result, the height of the vehicle is selectively dependent on which bushing member is disposed on the upper oriented side and which bushing member is disposed on the under oriented side, and the orientation of the thicker and thinner sections of each bushing member so disposed. As will be clearly apparent hereinafter, the determination of which of the bushing members are on the upper and under oriented sides of the suspension arm is established by which of the two operative orientations the suspension arm is desired to assume when connected to the vehicle.

The relative differences in the thickness of the first and second sections of each bushing member is predetermined so as to at least partially regulate and define the variance in the vehicle height when the suspension arm is connected to the vehicle in each of the two operative orientations. Further, in at least one embodiment, the two bushing members associated with the same suspension joint may be substantially equally dimensioned and configured. Alternatively, the variance in the height of the vehicle may be further regulated by varying the dimension and/or configuration of the two bushing members associated with a common suspension joint. The bushing members, in at least one embodiment, may comprise a thickness, along their outer periphery, in the range of approximately ⅛-inch to ¾-inch.

While the suspension arm and suspension joint of the present invention may be produced as equipment of original manufacture, a conventional suspension arm may be repaired or retrofitted by replacing its original joint with the modified suspension joint of the present invention. Therefore, the present invention comprises a method of repairing and/or retrofitting a conventional suspension arm used in a suspension assembly of a vehicle to a structure which facilitates the selective variance of the height of the vehicle, again, dependent on the operative orientation in which the modified suspension arm is disposed when connected to the vehicle. Known suspension arms including conventional suspension joints such as, but not limited to, a ball and socket type suspension joint may be subject to wear and a resulting unsatisfactory operation after a relatively short period of use, and must be replaced. As noted above, a considerable expense is typically incurred in the replacement of the entire conventional suspension arm.

To overcome this problem, the method of repairing or retrofitting a conventional suspension arm comprises removing the original suspension joint associated therewith and replacing it with the modified, unique suspension joint of the present invention. More specifically, the method includes cutting or otherwise removing a portion of the joint retaining structure from one end of the suspension arm associated with the original suspension joint. Thereafter, the original suspension joint is removed from the retaining structure in a manner which facilitates the attachment of a modified, unique suspension joint to the retaining structure of the original suspension arm. The present method, in at least one embodiment, further includes structuring each of two resilient bushing members to have different thicknesses or transverse dimensions along opposite or other appropriate sections thereof. Each of the two bushing members is connected to the retainer structure or other portions of the opposite ends on opposite sides of the suspension arm. In addition, the two bushing members connected to the one end of the conventional suspension arm are disposed in a predetermined orientation relative to one another which facilitates the selective height variance of the vehicle dependent on which of the two operative orientations the suspension arm is disposed when operatively connected to the vehicle.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION

Figure 1:
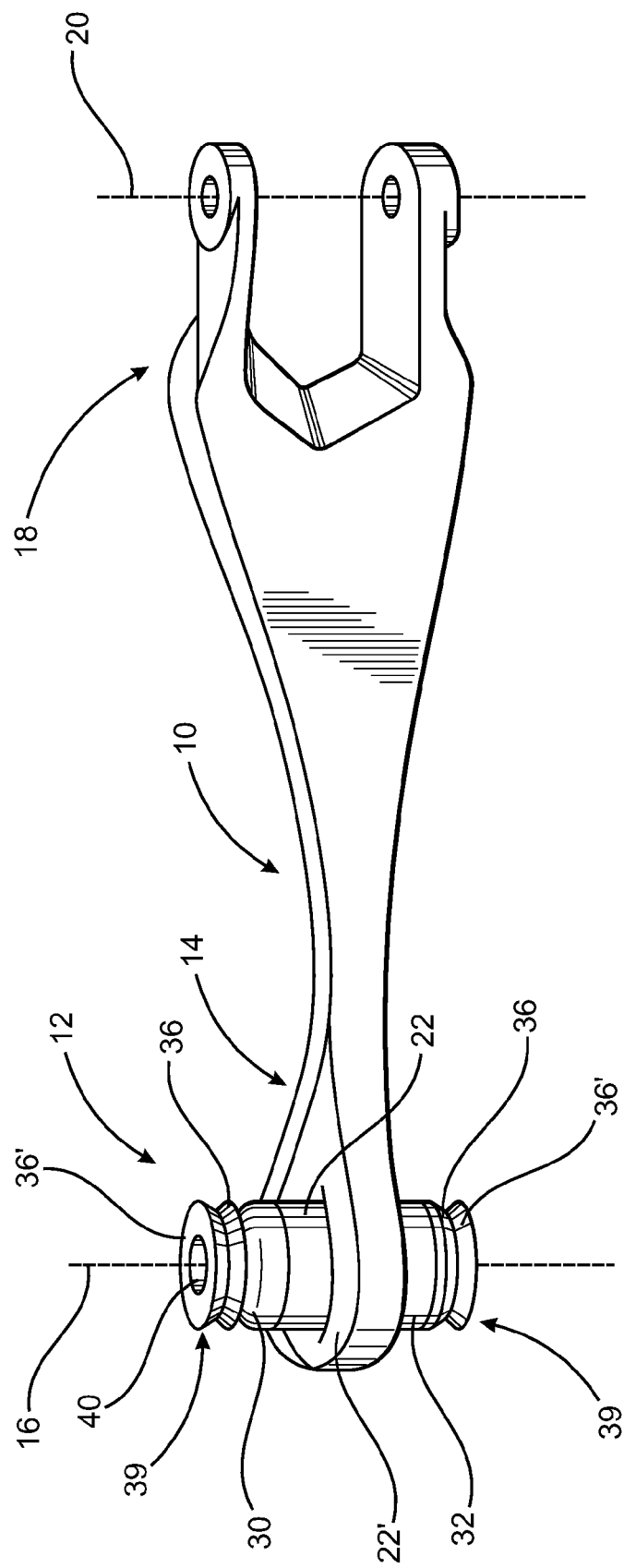
FIG. 1 is a perspective view of one embodiment of a suspension arm in accordance with the present invention.

As shown throughout the figures, the present invention is directed to a suspension assembly including at least one, but more practically, a plurality of suspension arms, generally indicated as 10. For purposes of clarity, the structural components and operative features of the suspension assembly of the present invention will be discussed with reference to the various embodiments of a single suspension arm 10. However, it is recognized that a suspension assembly for a motor vehicle typically comprises a plurality of suspension arms interconnected between the frame of the vehicle and different ones of corresponding wheel assemblies of a vehicle.

Accordingly, the suspension arm 10 includes an elongated configuration having a suspension joint generally indicated as 12. The suspension joint 12 is movably mounted on or attached to one end 14 of the suspension arm 10. End 14 may be generally referred to as the "vehicle end" of the suspension arm 10 in that it is interconnected to the frame of the vehicle through appropriate mechanical or connecting linkage. Axis 16 schematically represents the placement and/or attachment location of such connecting linkage, not shown for purposes of clarity. As also represented, the opposite end 18 of the suspension arm 10 is disposed and structured to interconnect the suspension arm 10 to a corresponding wheel assembly. In the embodiments represented, the "wheel end" 18 of the suspension arm 10 may have a substantially bifurcated configuration so as to facilitate movable, suspended interconnection along axis 20 thereof. For purposes of clarity the specific mechanical linkage and other structural components to which the "wheel end" 18 is interconnected to a wheel assembly is not specifically represented. Similarly, the wheel assembly to which the wheel end 18 of the suspension arm 10 is connected is not shown. However, both the vehicle frame, the wheel assembly and the various interconnecting components or mechanical linkage used to attach the suspension arm 10 into one or more operative orientations are schematically represented by the axis of interconnection 16 and 20 of the opposite ends 14 and 18, respectively.

Figure 2:
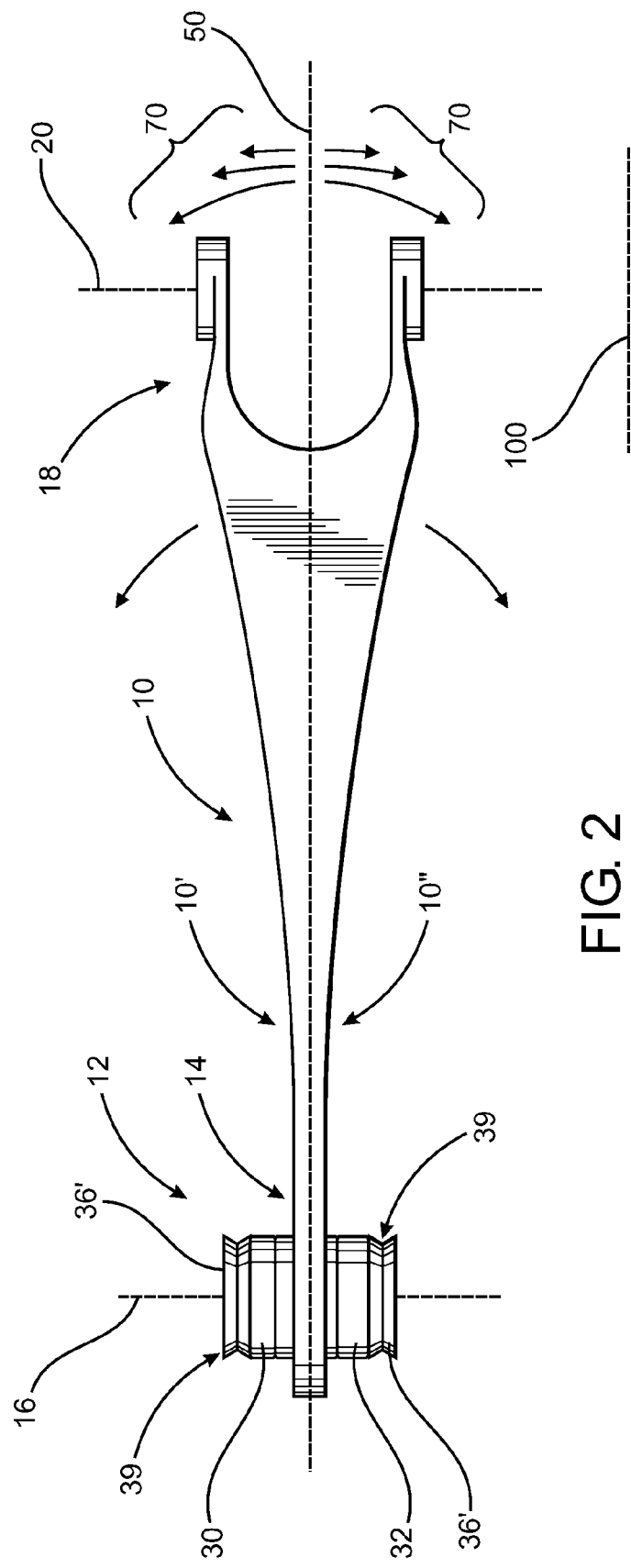
FIG. 2 is a side view of the embodiment of FIG. 1 representing a suspension arm and suspension joint in one possible operative orientation when mounted as part of a suspension assembly on a vehicle.
Figure 3:
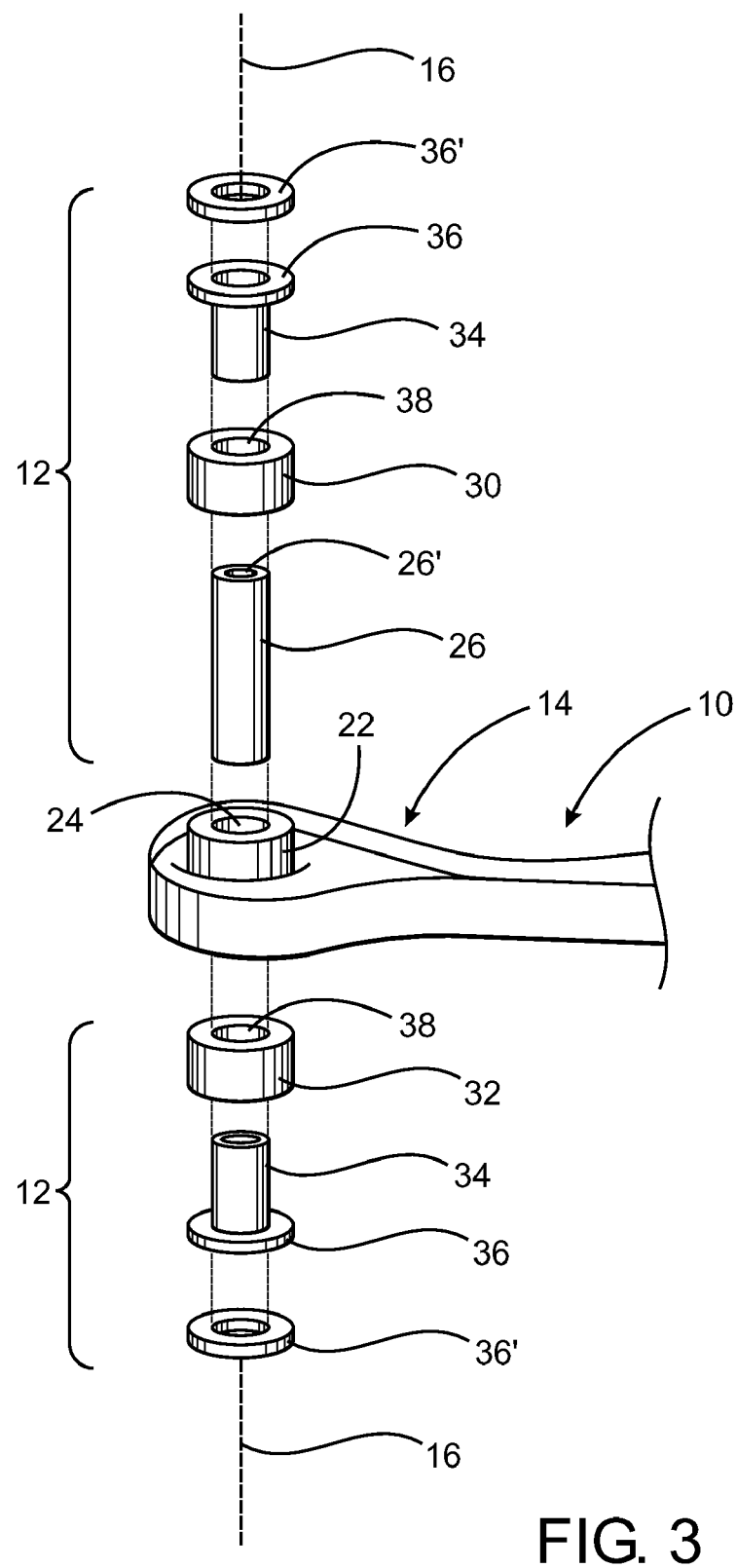
FIG. 3 is a partially cutaway perspective view in exploded form representing various components of one embodiment of a suspension joint as well as a general representation of a method of assembling the suspension arm.

With primary reference to FIGS. 1 through 3, the vehicle end 14 of the suspension arm 10 includes a joint retaining structure 22 integrally or fixedly connected thereto. Moreover, the retaining structure 22 may extend at least partially outward from opposite sides of the vehicle end 14. In at least one embodiment, the surface 22' of the vehicle end 14 of the suspension arm 10 serves as the "retaining structure." The retaining structure 22 includes a hollow or open interior, defining a passage or chamber 24 which extends completely through the interior of the retaining structure 22 as well as the vehicle end 14. The passage or chamber 24 is dimensioned and configured to facilitate the insertion and retention of the joint assembly 12. As will be explained in greater detail hereinafter, the interior passage or chamber 24 passing through the vehicle end 14 may also be structured, in terms of dimension and configuration, to accommodate various types of conventional joint assemblies such as, but not limited to, a ball and socket type joint assembly.

As represented in FIG. 3, at least one embodiment of the joint assembly 12 may include a mounting sleeve 26 having a hollow interior or through passage 26' extending within and along the length thereof. In addition, the suspension joint 12 also includes two bushing members 30 and 32 each mounted on a corresponding retaining pin 34 which may include an outwardly, radially extending, retaining flange 36. In at least one embodiment, the retaining flange 36 is structured to comprise a diameter substantially equal to that of a corresponding bushing 30 or 32. Further, a lower retaining flange (not shown) may be disposed to extend outwardly from retaining structure 22 so as to underlie bushing 30 or 32, in embodiments of the suspension joint 12 wherein the diameter of bushings 30, 32 exceeds that of retaining structure 22, resulting in "stiffer" handling characteristics of the vehicle.

As demonstrated in the illustrative embodiment of FIG. 3, each of the at least two bushing members 30 and 32, have a generally annular configuration and an opening or channel 38 passing through a mid-portion thereof. The relative dimensions of each of the retaining pins 34 and the interior channels 38 facilitate the insertion of the retaining pin 34 through corresponding ones of the bushing members 30 and 32 so as to facilitate a telescopic or other appropriate connection of the retaining pins 34 with the mounting sleeve 26.

Figure 8:
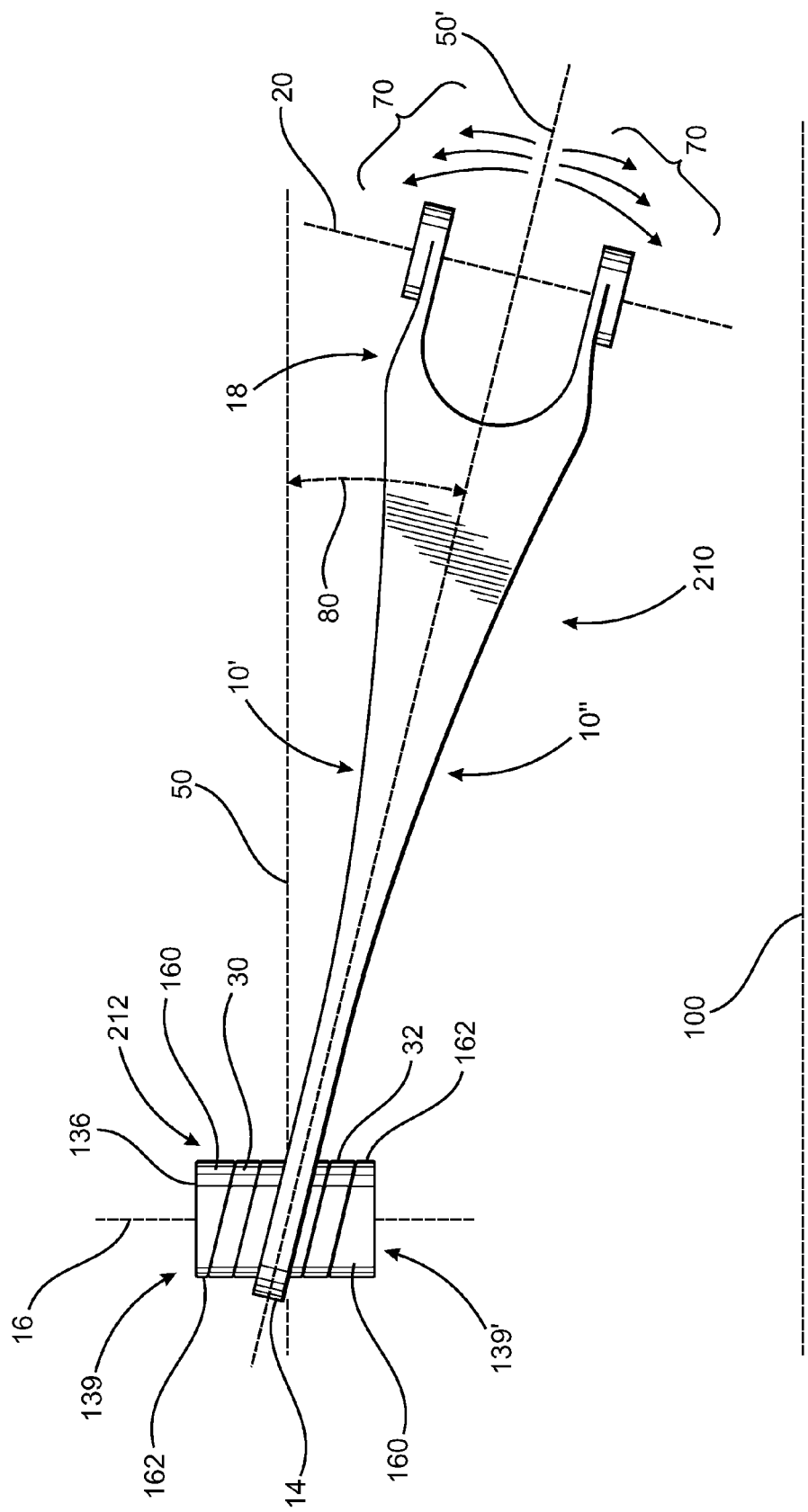
FIG. 8 is a side view of yet another embodiment of a suspension arm and associated suspension joint of the suspension assembly of the present invention in one operative orientation similar to that of the embodiment of FIG. 4.

Once disposed into the assembled orientation of FIGS. 1 and 2 and FIGS. 4 and 5, the bushing members 30 and 32 will be retained in a substantially clamped and/or sandwiched relation between the exterior portions of the retaining structure 22 and the retaining flange 36. To assure such retention of the bushing members 30 and 32 in their assembled orientation, an additional or supplemental retaining flange 36' may be fixedly secured to the extremities of the mounting sleeve 26 in abutting, contiguous relation to the retaining flange 36. Accordingly, a retaining assembly 39 including one or both of the corresponding retaining flanges 36 and 36' is fixedly or integrally connected to each of the retaining pins 34 and disposed in retaining relation to a correspondingly positioned ones of the bushings 30 and 32. In at least one embodiment, and as illustrated in FIG. 8, a retaining assembly 139 comprises a single retaining flange 136 having a predetermined configuration and orientation which facilitates a selective variance in a height and corresponding center of gravity of a vehicle when operatively connected thereto.

Accordingly, the suspension joint 12 will have an interior channel or passage 40, primarily defined by the through passage 26' of the mounting sleeve 26, extending completely through the suspension joint 12 mounted to the vehicle end 14 of the suspension arm 10. Further, the interior channel 40 is dimensioned and configured to receive an appropriate connecting structure or mechanical linkage which facilitates the interconnection of the vehicle end 14 of the suspension arm 10 to the frame of the vehicle along axis 16, via the suspension joint 12.

In at least one embodiment, the bushing members 30 and 32 are constructed of resilient, compressible material such as urethane, polyurethane, polypropylene, rubber, or other appropriate material demonstrating sufficient compressive and resistive physical characteristics and preferably having a durometer of generally between 70 and 90 shore. As illustrated in the embodiments of FIGS. 1 through 3 and 8, bushing members 30 and 32 have substantially equivalent dimensions and configurations. As such, the thickness or transverse dimension of each of the bushing members 30 and 32 is substantially the same along the entire peripheral portions surrounding the central channel or passage 38. In contrast, the thickness or transverse dimension of each of the bushing members 130 and 132 varies along their peripheral portion surrounding the central channel or passage 38, as represented in the embodiment of FIGS. 4 through 7 and as will be discussed in greater detail hereinafter. It is emphasized that while the bushing members 30, 32, 130, and 132 are represented and described as comprising a substantially annular configuration, each or both of the bushing members may be formed or structured to include a multi-sided or other appropriate configuration, as will become more apparent hereinafter.

Furthermore, when the suspension arm 10 is mounted on the vehicle in interconnecting relation between a corresponding wheel assembly and the vehicle frame in the operative orientation of FIG. 2, each of the bushing members 30 and 32 are located on a different opposite side of the suspension arm 10. More specifically, the bushing member 30 is located on what may be referred to as an "upper oriented" side, generally indicated as 10' and the bushing member 32 is located on an "under oriented" side 10" of the suspension arm 10. It is emphasized that the term "upper oriented" and "under oriented" respectively refer to the opposite sides 10' and 10" of the suspension arm 10 when it is interconnected to the vehicle in either of at least two operative orientations, such as the orientations illustrated in FIGS. 4 and 5. As set forth above, when so operatively oriented, the vehicle end 14 of the suspension arm 10 is interconnected to the vehicle frame along the axis 16 of the joint assembly 12 and the wheel end 18 of the suspension arm 10 is interconnected to a wheel assembly along axis 20.

For purposes of clarity, the terms "upper oriented" and "under oriented" may also refer to the orientation of the suspension arm 10 relative to the ground or other supporting surface schematically represented as 100 on which the wheel assemblies of the vehicle rest and travel. It is recognized that the axes 16 and 20, depending on the orientation and structure of the vehicle frame, the wheel assemblies, as well as the associated connecting linkage, may not be oriented in an absolute perpendicular orientation relative to the ground or supporting surface 100. However, these axes 16 and 20 will be oriented in substantially transverse relation to the supporting surface 100 at least to the extent that the opposite sides 10' and 10' of the suspension arm 10 can be accurately and respectively described as being "upper oriented" and "under oriented".

In order to further emphasize the performance and operational features of the present invention, primary reference is made to FIG. 2. As represented, the physical characteristics and in particular the uniform thickness of each of the bushing members 30 and 32 will result in the tendency of the suspension arm 10 to assume a substantially level or horizontal operative orientation, relative to the supporting surface 100 over which the vehicle travels. This substantially horizontal orientation is schematically represented by the horizontal axis 50 disposed along the length of the suspension arm 10. Moreover, the operative orientation along the length of the suspension arm 10 in aligned relation to the horizontal axis 50 will result in the vehicle assuming a substantially standard yet slightly elevated vehicle height. More specifically, when each of the bushing members 30 and 32 have a common thickness and each of the retainer assemblies 39 also have a common thickness about the their respective continuous peripheral portions, the suspension arm 10 may assume an orientation substantially common to the reference axis 50. For purposes of clarity, the reference axis 50 is schematically indicated as being horizontal. However, it is emphasized that the true orientation of the suspension arm 10 may be other than precisely level or horizontal when it is mounted on the vehicle, when the bushings 30 and 32 and the retaining assembly 39 are respectively dimensioned and configured as represented in FIGS. 1 through 3 and described above.

However, a variance in the substantially common alignment between the suspension arm 10 and the reference axis 50 may be altered based on the relative position of the bushing members 30 and 32 as well as their dimensions and configurations. By way of example, when one of the bushing members 30 or 32 is attached to the suspension joint 12 a greater distance from the corresponding surface 22' of the vehicle end 14 than that of the opposite bushing member, the alignment between the suspension arm 10 and the reference axis 50 may be altered. Further, when the bushing members 30 and 32 are equally spaced outwardly from the vehicle end 14, the height of the vehicle may also be varied dependent on a difference in the thicknesses or other dimensions of the bushing members 30 or 32 as well as their respective locations on the upper oriented side 10' or the under oriented side 10" of the suspension arm 10. Similarly, when the thickness of one or both of the peripheral portions of the retaining assemblies 39 are different, the alignment between the suspension arm 10 and the reference axis 50 may be altered as well as the height of the vehicle. Therefore, the orientation of the suspension arm 10 relative to the reference axis 50 and the height of the vehicle may vary dependent on which operative orientation the suspension arm 10 is disposed.

Figure 4:
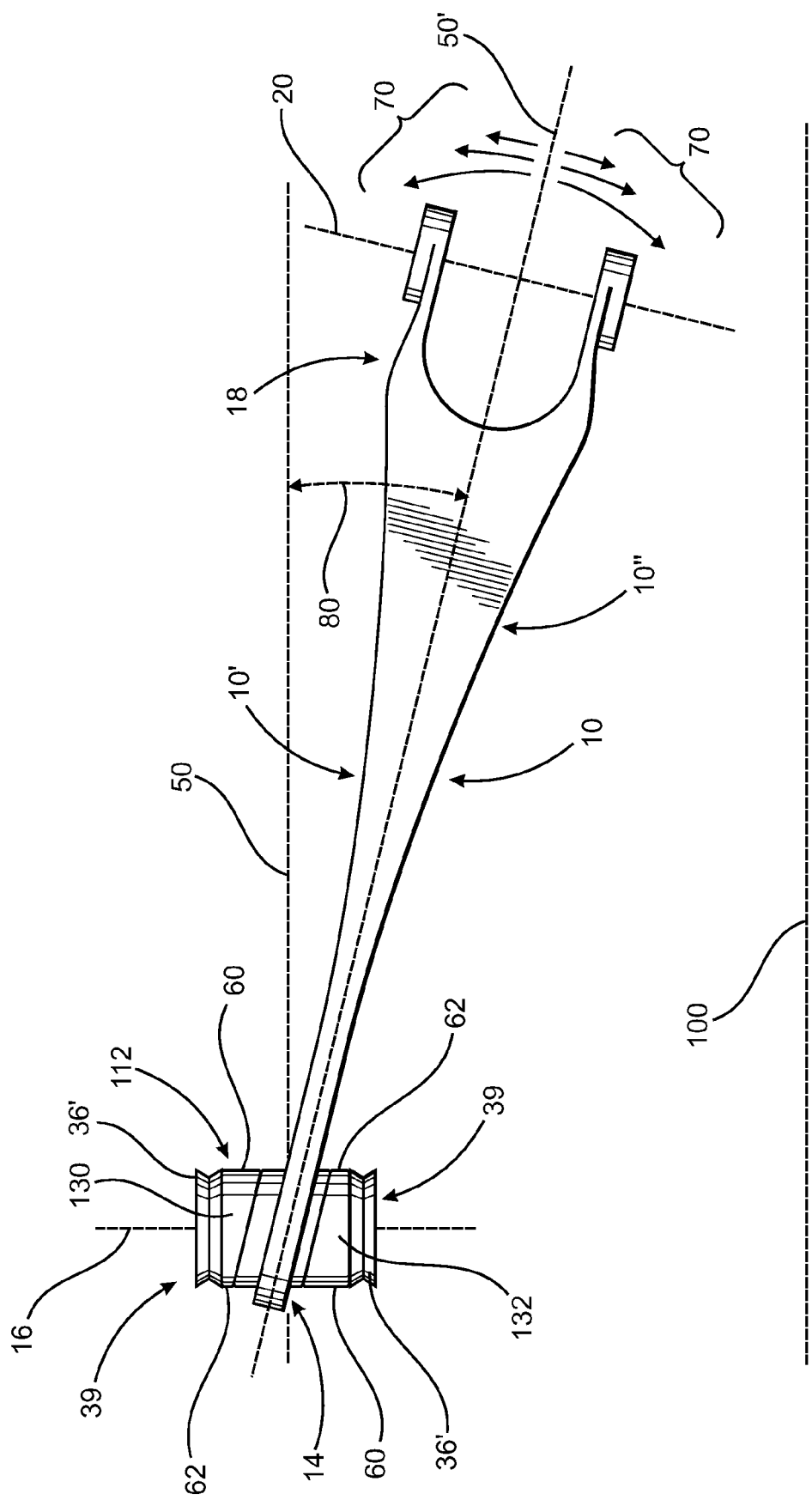
FIG. 4 is a side view of at least one additional embodiment of a suspension arm associated with the suspension assembly of the present invention in one operative orientation.
Figure 5:
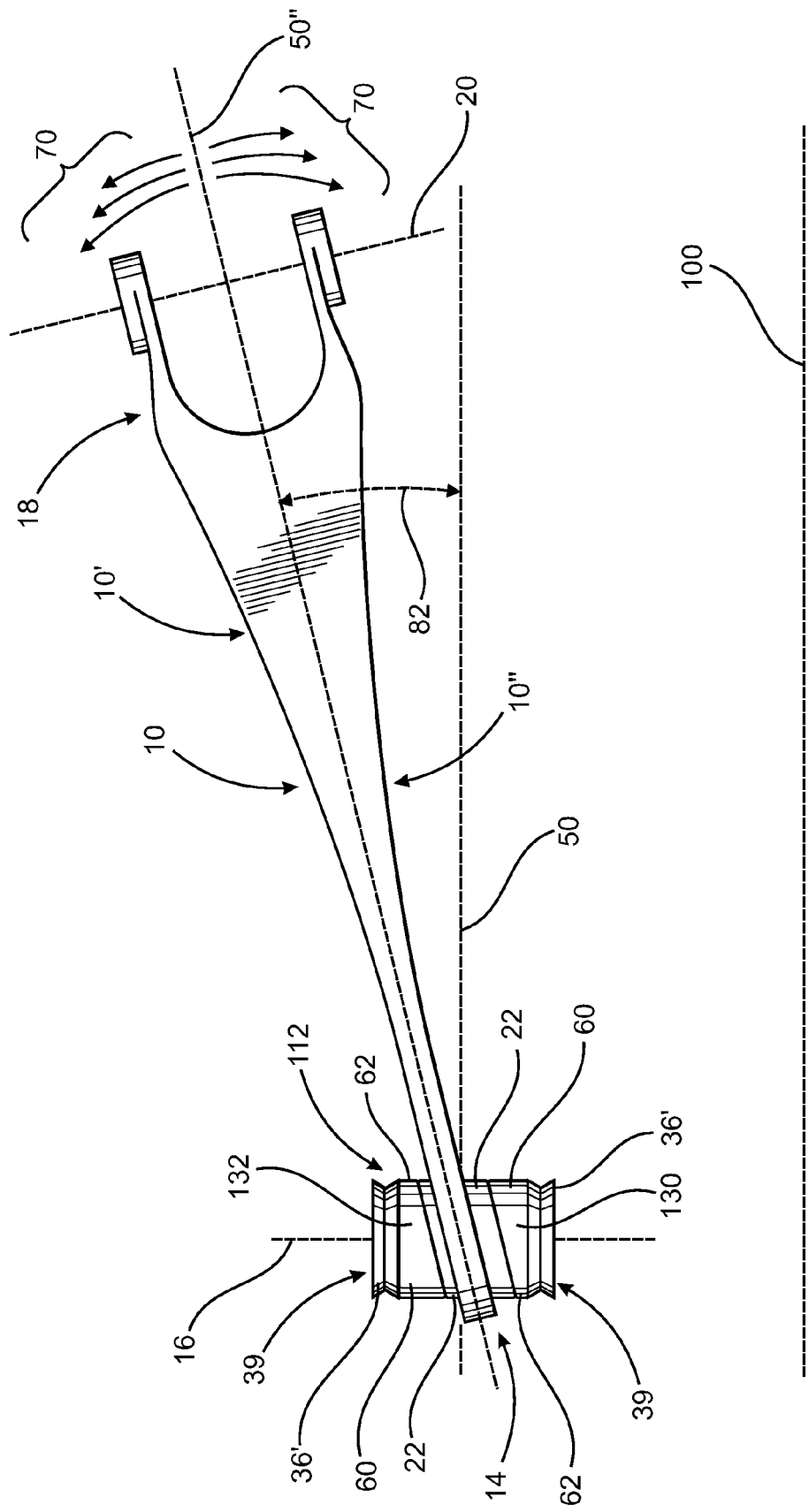
FIG. 5 is a side view of the suspension arm of FIG. 4 in an alternative operative orientation.

In the additional preferred embodiment of FIGS. 4 through 7, the suspension assembly includes a suspension arm 10 having a suspension joint 112 connected to the vehicle end 14 thereof. While the structural components of the embodiment of FIGS. 4 and 5 are substantially equivalent, FIG. 4 represents a first of two operative orientations of the suspension arm 10 when disposed in interconnecting relation between the vehicle and a corresponding wheel assembly generally about axes 16 and 20 respectively. In contrast, FIG. 5 represents the suspension arm 10 and the suspension joint 112 disposed in the other or second of two operative orientations, while being disposed in interconnecting relation between the vehicle and a corresponding wheel assembly generally along axes 16 and 20 respectively. Further in the embodiment of FIGS. 4 through 7, the joint assembly 112 includes two bushing members 130 and 132, each disposed on an opposite side of the suspension arm 10 at the vehicle end 14 thereof. As shown in FIGS. 4 through 7, bushing members 130 and 132 differ from the embodiment of the bushing members 30 and 32 of FIGS. 1 and 2. Specifically, bushing members 130 and 132 are formed with a variance in thickness or transverse dimension of different portions or sections thereof. Further, the structural features of this embodiment include each of the retaining assemblies 139 having a common or substantially equal thickness along the peripheral portions thereof.

Figure 6:
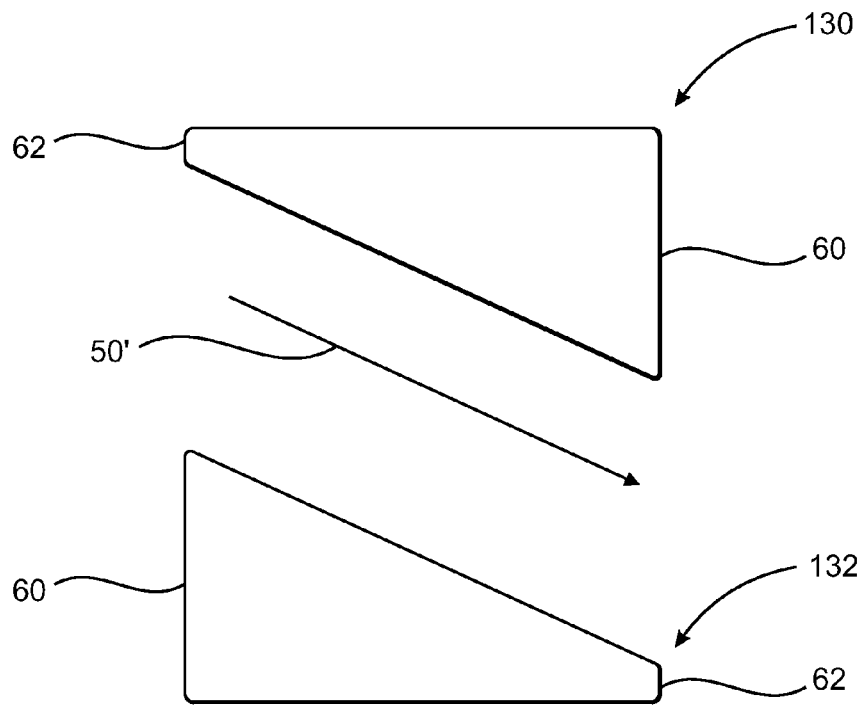
FIG. 6 is a schematic representation of two bushing members of the joint assembly of the present invention when in a first operative orientation represented in FIG. 4.
Figure 7:
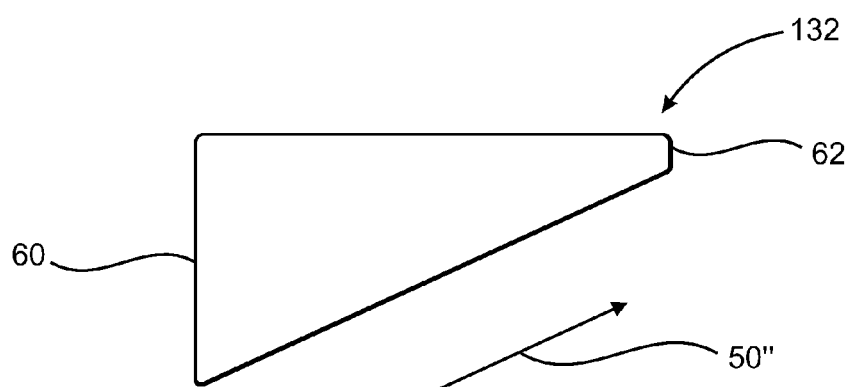
FIG. 7 is a schematic representation of the bushing members of the embodiment of FIG. 6 when disposed in an operative orientation of FIG. 5.
Figure 7:
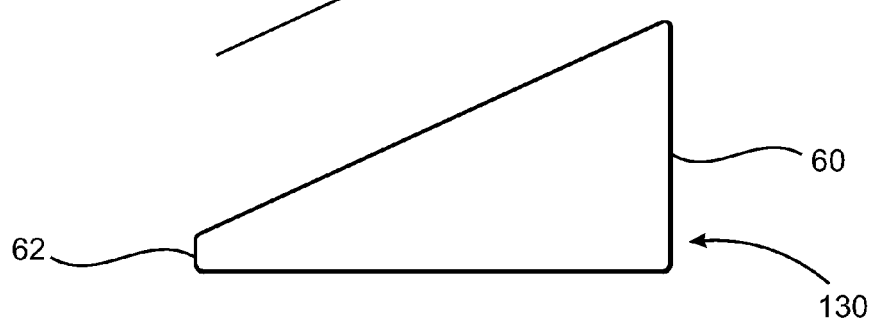

More specifically, and as best represented in FIGS. 6 and 7, each of the bushing members 130 and 132 include at least two differently dimensioned sections comprising a first section 60 and a second section 62. As schematically represented, each of the first and second sections 60 and 62 of each bushing member 130 and 132 are disposed in spaced, opposing relation to one another. Moreover, when each of the bushing members 130 and 132 comprise an annular configuration as represented in FIG. 3, the first and second sections 60 and 62 may be considered at least partially diametrically opposed so as to extend along opposite peripheral portions of the respective bushing members 130 and 132. As also represented in FIGS. 6 and 7, the bushing member segments 60 and 62 comprise different thicknesses at least to the extent that one of the bushing member sections, as at 60, has a significantly greater thickness than the oppositely disposed bushing member section 62. Further, in at least one embodiment each of the bushing members 130 and 132, associated with the same suspension joint 112, may be equally dimensioned and configured. However, the dimension and configuration of the corresponding bushing members 130 and 132 may vary from one another, within predetermined parameters, in order to further define and/or regulate different heights of the vehicle. Again regardless of these structural modifications relating to the dimensions of the cooperatively disposed bushing members 130 and 132, the height of the vehicle will be further dependent on which of the operative orientations the suspension arm is disposed as represented in FIGS. 4 and 5.

Therefore, the suspension joint 112 of the embodiments of FIGS. 4 and 5 include two bushing members 130 and 132 formed of a resilient material such as, but not limited to, urethane, polyurethane, rubber, polypropylene, or other appropriate materials, as previously indicated. Further, each of the bushing members 130 and 132 have a varied thickness extending along the respective peripheries thereof. Such a varied thickness is more specifically defined by one of a plurality of sections 60 having a greater or thicker dimension and the other oppositely disposed section 62 having a lesser or thinner dimension. Additional features of the suspension joint 112 comprises the bushing members 130 and 132 having their respective first and second sections 60 and 62 being substantially oppositely oriented on the suspension arm 10 relative to the corresponding vehicle end 14 thereof. More specifically, the first and second sections 60 and 62 of bushing member 130 are oppositely oriented relative to the first and second section 60 and 62 of the bushing member 132, as represented in both FIGS. 4 and 5. Such an opposite orientation of the first and second section 60 and 62 of each of the bushing members 130 and 132 is maintained when the suspension arm 10 is either in the operative orientation of FIG. 4 or the operative orientation of FIG. 5.

Accordingly, when the suspension arm 10 and the joint assembly 112 is in the operative orientation, as represented in FIG. 4, bushing member 130 is disposed on an upper oriented side 10' of the suspension arm 10 and bushing member 132 is disposed on an under oriented side 10" of the suspension arm 10. As a result, and due at least in part to the varied thicknesses of each of the bushing members 130 and 132, as defined by the thicker and thinner sections 60 and 62 respectively, the angular orientation of the suspension arm 10 will be displaced, as at 80, into an angular orientation 50' relative to conventional orientation schematically represented by axis 50. In turn this angular displacement 80 and orientation 50' will result in an increase in the elevation of the frame of the vehicle relative to the supporting surface 100. As previously noted, this change in vehicle height necessarily results in a change in the effective center of gravity of the vehicle, in this case, increasing the same, thereby imparting improved suspension characteristics to the vehicle. As should be apparent during the travel of the vehicle, the suspension arm 10 will result in a concurrent compression of both the first and second bushing members 130 and 132 as a result of the movement or "flexing" of the suspension arm 10 relative to the first and second bushing members 130 and 132 in a substantially transverse direction, as schematically represented by directional arrows 70.

In contrast, when the suspension arm 10 is in the second of two operative orientations, as represented in FIG. 5, the bushing member 130 will be disposed on an under oriented side 10" of the suspension arm 10 while the other of the two bushing members 132 will be disposed on the upper oriented side 10' of the suspension arm 10. Therefore, when the suspension arm 10 is in the operative orientation of FIG. 5, the result will be a decrease in the elevation of the vehicle frame relative to the supporting surface 100 based on a substantially upward angular displacement 82 and angular orientation along axis 50" of the length of the suspension arm 10 relative to the axis 50. As before, the origination of the suspension arm 10 in accordance with FIG. 5 will also result in a change to the effective center of gravity of the vehicle, specifically, decreasing the center of gravity and thereby improving the handling characteristics of the vehicle.

It is acknowledged and emphasized that the angular displacement schematically represented as 80 and 82 along the length of the suspension arm 10 relative to a substantially conventional and at least partially level position of the suspension arm, as at 50, is not meant to be representative of an actual dimension of the angular displacement, rather, the angular displacements 80 and 82 are merely schematic representations of a relative variance in the height of the vehicle frame to which the suspension joint 112 is interconnected. Accordingly, when the suspension arm 10 is in the first operative orientation of FIG. 4, the height of the vehicle, and the effective center of gravity, will be increased, and when the suspension arm 10 is in the second operative orientation of FIG. 5, the vehicle height and effective center of gravity will be decreased.

The two operative orientations of FIGS. 4 and 5 are further defined with reference to the respective positions of the bushing members 130 and 132. When the suspension arm 10 is in the operative orientation of FIG. 4, the thicker sections 60 of each of the bushing members 130 and 132 will be oppositely oriented as will be the corresponding thinner sections 62 thereof. As a result, the positioning of the bushing members 130 and 132 on the upper oriented side 10' and the under oriented side 10" respectively will result in the angular orientation along the length of the suspension arm 10 being schematically represented as at 50'. This will result in a decrease in the elevation of the frame of the vehicle relative to the supporting surface 100. Alternatively, a comparison of FIGS. 5 and 7 indicates that when the suspension arm 10 is in the operative orientation of FIG. 5, the bushing members 132 and 130 are respectively disposed on the upper oriented side 10' and the under oriented side 10". This operative orientation will result in the suspension arm 10 being oriented at the inclination schematically represented as 50", resulting in a decrease in the elevation of the vehicle frame relative to the supporting surface 100 over which the vehicle travels.

Yet another embodiment of the suspension arm is generally indicated as 210 in FIG. 8 and includes a suspension joint 212, operatively similar but structurally distinguishable from the embodiment of FIGS. 4 and 5. More specifically, the suspension joint 212 of the embodiment of FIG. 8 includes two bushing members 30 and 32 formed of a resilient, compressible material such as, but not limited to, polyurethane or other appropriate materials, as previously indicated. Further, each of the bushing members 30 and 32 have a common thickness extending along the respective peripheries thereof, as also represented in FIGS. 1 through 3. The suspension joint 212 also comprises two retaining assemblies 139 and 139' each disposed on an opposite side of the vehicle end 14 of the suspension arm 210 in retaining engagement with a different one of the bushing members 30 and 32. Further, each of the retaining assemblies 139 and 139' has a varied thickness extending along the respective peripheries thereof. Such a varied thickness is more specifically defined by one of a plurality of sections 160 having a greater or thicker dimension and the other oppositely disposed section 162, which has a lesser or thinner dimension. Additional features of the suspension joint 212 comprise the retaining assemblies 139 and 139' having their respective first and second sections 160 and 162 being substantially oppositely oriented on the suspension arm 210 relative to the corresponding vehicle end 14 thereof. More specifically, the first and second sections 160 and 162 of retaining assembly 139 are oppositely oriented relative to the first and second section 160 and 162 of the retaining assembly 139' as clearly represented in FIG. 8. Such an opposite orientation of the first and second section 160 and 162 of each of the retaining assemblies 139 and 139' is maintained when the suspension arm 210 is in the operative orientation of FIG. 8 or when the suspension arm 210 assumes the opposite, inverted operative orientation similar to that of FIG. 5.

Accordingly, when the suspension arm 210 and the joint assembly 212 are in the operative orientation represented in FIG. 8, retaining assembly 139 is disposed on an upper oriented side 10' of the suspension arm 210 and retaining assembly 139' is disposed on an under oriented side 10" of the suspension arm 210. As a result, and due at least in part to the varied thicknesses of each of the retaining assemblies 139 and 139', as defined by the thicker and thinner sections 160 and 162, respectively, the angular orientation of the suspension arm 210 will be displaced, as shown at 80, into an angular orientation 50' relative to a standard orientation schematically represented by reference axis 50. In turn, this angular displacement 80 and orientation 50' will result in an increase in the elevation of the frame of the vehicle relative to the supporting surface 100. As previously noted, this change in vehicle height necessarily results in a change in the effective center of gravity of the vehicle, in this case, increasing the same, thereby imparting improved suspension characteristics to the vehicle. As should be apparent during the travel of the vehicle, the suspension arm 210 will result in a concurrent compression of both the first and second bushing members 130 and 132 as a result of the movement or "flexing" of the suspension arm 10 relative to the suspension joint 112, in a substantially transverse direction relative to the first and second bushing members 130 and 132, as schematically represented by directional arrows 70.

In contrast, when the suspension arm 210 is in the second of two operative orientations, similar or equivalent to that represented in FIG. 5, the retaining assembly 139 will be disposed on an under oriented side 10" of the suspension arm 10 while retaining assembly 139' will be disposed on the upper oriented side 10' of the suspension arm 210. Therefore, when the suspension arm 210 is in the operative orientation similar to that illustrated in FIG. 5, the result will be a decrease in the elevation of the vehicle frame relative to the supporting surface 100 based on a substantially upward angular displacement 82 and angular orientation along axis 50" of the length of the suspension arm 10 relative to the axis 50 (see FIG. 5). As before, the orientation of the suspension arm 10 in accordance with FIG. 5 will also result in a change to the effective center of gravity of the vehicle, specifically, decreasing the center of gravity, and thereby improving the handling characteristics of the vehicle.

Figure 9:
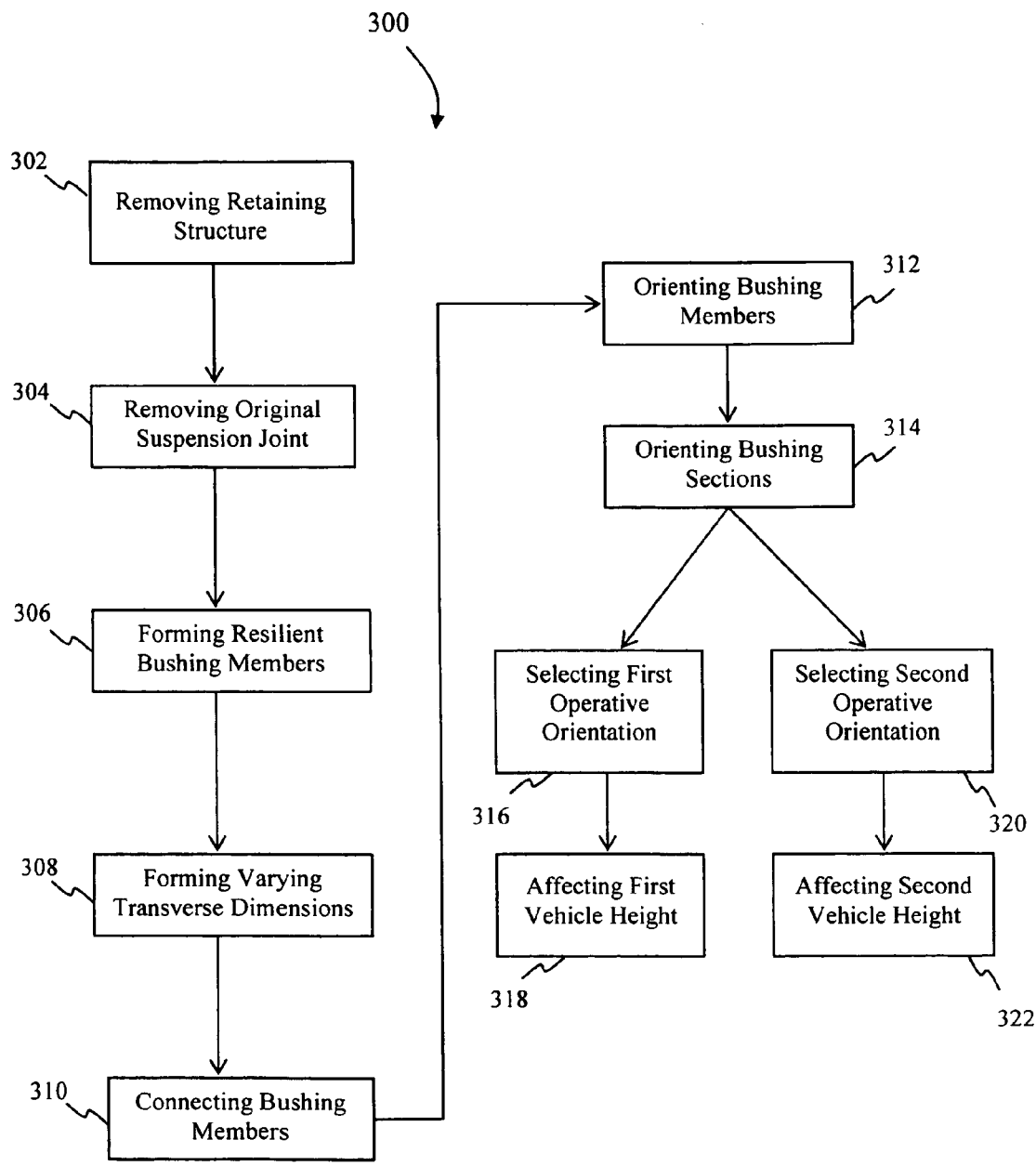
FIG. 9 is a schematic representation in block diagram form representing a method of repairing or retrofitting a conventional suspension arm to incorporate the suspension joint of the present invention, thereby facilitating a selective variance of the height of the vehicle on which the modified suspension arm is mounted.

The present invention further comprises a method 300 of repairing and/or retrofitting a conventional or existing vehicle suspension arm in a manner which facilitates the selective variance in the height of the vehicle dependent, at least in part, on the operative orientation of the suspension arm 10 when connected to the vehicle. More in particular, and as schematically represented in FIG. 9, the method 300 comprises removing a portion of the retaining structure 22, as at 302. Such removal may be accomplished by cutting or otherwise detaching one side of the retaining structure 22 to a sufficient degree to allow removal of the original or conventional joint assembly, as at 304. As also set forth above, the original joint assembly may or may not be of the ball and socket type of construction which is commonly included as part of suspension assemblies for high performance and/or sport vehicles. Once the retaining structure 22 has been at least partially removed, as at 302, the original suspension joint is removed 304 from the corresponding vehicle end 14 with which the retaining structure 22 is associated.

In addition, bushing members 130 and 132, are formed of a resilient, compressible material, as at 306, and, in at least one further embodiment, bushing members 130 and 132 are formed to have varying thicknesses along substantially oppositely disposed sections 60 and 62 thereof, as at 308. The formed bushing members 130 and 132 are connected as part of a modified or substituted suspension joint 112, as at 310, in a retaining relation on opposite sides of the vehicle end 14 of the suspension arm 10. The conversion of the conventional suspension arm further includes orienting bushing members 130 and 132 on the corresponding vehicle end 14 in a predetermined orientation relative to one another to facilitate the selective height variance of the vehicle dependent on which of the two operative orientations (see FIG. 4 and FIG. 5), as at 312. Further, the predetermined orientation of bushing members 130 and 132 include the corresponding thicker and thinner sections 60 and 62, respectively, being disposed in a substantially opposite orientation relative to one another, as at 314, and as shown in FIGS. 4 and 5.

Accordingly, and as at set forth above, the present method comprises forming bushing members 130 and 132 including a thicker section 60 and thinner section 62 being integrally or otherwise fixedly secured to one another and being substantially oppositely or diametrically opposed depending at least in part on the configuration of the bushing members 130 and 132. More specifically, the thicker and thinner sections 60 and 62 on one of the two bushing members 130 and 132 are disposed in a substantially opposite orientation to the thicker and thinner section 60 and 62 of the other of the two bushing members, regardless of the operative orientation in which the suspension arm 10 and joint assembly 112 are disposed.

Further and as set forth with reference to FIGS. 4 through 7, selection of the first or second operative orientation of the suspension arm 10, as at 316 and 320 of FIG. 9, is determined by the suspension arm 10 being oppositely inverted between the positions of FIGS. 4 and 5. More specifically, as also set forth above, the operative orientation of the suspension arm 10 is further defined by disposing different ones of the two bushing members 130 and 132 on an upper oriented side 10' and an under oriented side 10", when the suspension arm 10 is connected to the vehicle. As such, the disposition of the suspension arm 10 in the first or second operative orientation, as at 316 and 320, will result in different heights of the vehicle, as at 318 and 322, respectively.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A suspension assembly structured to facilitate a selective variance in a height and corresponding center of gravity of a vehicle when operatively connected thereto, said suspension assembly comprising:
   at least one suspension arm including a suspension joint disposed on one end of said suspension arm,
   said suspension joint disposed and structured to extend through said one end in outwardly extending relation thereto,
   said suspension joint comprising at least two bushing members each formed of a resilient, compressible material and at least two retaining assemblies,
   each of said two retaining assemblies disposed in retaining relation to a different one of said two bushing members on opposite sides of said one end,
   each of said two bushing members cooperatively disposed with said suspension arm to facilitate concurrent compression of said two bushing members upon movement of said suspension arm relative to said suspension joint in a substantially transverse direction relative to said two bushing members,
   said suspension arm and said suspension joint connectable to the vehicle in one of a plurality of operative orientations, wherein said operative orientation at least partially defines the vehicle height, and
   said suspension arm and said suspension joint are attachable to the vehicle in either of two oppositely inverted operative orientations, each of said two operative orientations defining a different vehicle height.

2. A suspension assembly as recited in claim 1 wherein each of said two operative orientations are respectively defined by different ones of said two bushing members disposed on an upper oriented one of said opposite sides of said suspension arm and an under oriented one of said opposite sides of said suspension arm, when said suspension arm is connected to the vehicle.

3. A suspension assembly as recited in claim 1 wherein each of said two bushing members comprises a substantially annular configuration including an aperture extending through a mid portion thereof.

4. A suspension assembly as recited in claim 3 wherein each of said bushing members comprises a first section and a second section disposed in at least partially spaced relation to one another along a curvilinear periphery thereof, wherein said first section and said second section comprise different predetermined thicknesses.

5. A suspension assembly as recited in claim 4 wherein said first and second sections of corresponding ones of each of said bushing members are substantially diametrically opposed.

6. A suspension assembly as recited in claim 1 wherein each of said bushing members comprises a first section and a second section disposed in at least partially spaced relation to one another along a periphery thereof, wherein said first section and said second section comprise different predetermined thicknesses.

7. A suspension assembly as recited in claim 6 wherein corresponding ones of said first and second sections of each of said bushing members are substantially diametrically opposed.

8. A suspension assembly as recited in claim 6 wherein said first and second sections of each bushing member extend along substantially oppositely disposed peripheral portions thereof.

9. A suspension assembly as recited in claim 8 wherein said first and second sections of one of said two bushing members of said suspension joint are oppositely disposed on said suspension arm relative to said first and second sections of the other of said two bushing members of said suspension joint, when said suspension arm is connected to the vehicle in either of said operative orientations.

10. A suspension assembly as recited in claim 1 wherein each of said two operative orientations are respectively defined by different ones of said two retaining assemblies disposed on an upper oriented one of said opposite sides of said suspension arm and an under oriented one of said opposite sides of said suspension arm, when said suspension arm is connected to the vehicle.

11. A suspension assembly as recited in claim 10 wherein each of said two retaining assemblies comprises a first section and a second section disposed in at least partially spaced relation to one another along a periphery thereof, wherein said first section and said second section comprise different predetermined thicknesses.

12. A suspension assembly as recited in claim 11 wherein said first and second sections of corresponding ones of each of said two retaining assemblies are substantially diametrically opposed.

13. A suspension assembly as recited in claim 1 wherein each of said two retaining assemblies comprises a first section and a second section disposed in at least partially spaced relation to one another along a periphery thereof, wherein said first section and said second section comprise different predetermined thicknesses.

14. A suspension assembly as recited in claim 13 wherein corresponding ones of said first and second sections of each of said two retaining assemblies are substantially diametrically opposed.

15. A suspension assembly as recited in claim 14 wherein said first and second sections of one of said two retaining assemblies of said suspension joint are oppositely disposed on said suspension arm relative to said first and second sections of the other of said two retaining assemblies of said suspension joint, when said suspension arm is connected to the vehicle in either of said operative orientations.

16. A suspension assembly structured to facilitate a selective variance in a height and center of gravity of a vehicle when operatively connected thereto, said suspension assembly comprising:
   at least one suspension arm including a suspension joint connected to one end of said suspension arm,
   said suspension arm and said suspension joint collectively disposable on the vehicle in either of at least two operative orientations, each of said two operative orientations defining a different height and center of gravity of the vehicle, said suspension joint comprising at least two bushing members each formed of a resilient, compressible material, each of said two bushing members connected to and extending outwardly from an opposite side of said suspension arm, each of said two operative orientations defined by different ones of said two bushing members and corresponding ones of said opposite sides respectively defining an upper oriented side and an under oriented side of said suspension arm when connected to the vehicle, and each of said two bushing members cooperatively disposed with said suspension arm to facilitate concurrent compression of said two bushing members upon movement of said suspension arm relative to said suspension joint in a substantially transverse direction relative to said two bushing members.

17. A suspension assembly as recited in claim 16 wherein each of said two bushing members includes first and second sections each having a predetermined different thickness.

18. A suspension assembly as recited in claim 17 wherein said first and second sections of each of said two bushing members are substantially oppositely disposed.

19. A suspension assembly as recited in claim 18 wherein said first and second sections of one of said bushing members disposed on said upper oriented side are oppositely oriented relative to said first and second sections of the other of said two bushing members disposed on said under oriented side, when said suspension arm is in either said first or second operative orientations.

20. A suspension assembly as recited in claim 17 wherein said two bushing members are substantially equally dimensioned and configured.

* * * * *